Dec. 9, 1941.   E. W. CARROLL   2,265,515
FRUIT ORIENTATOR
Filed May 28, 1940
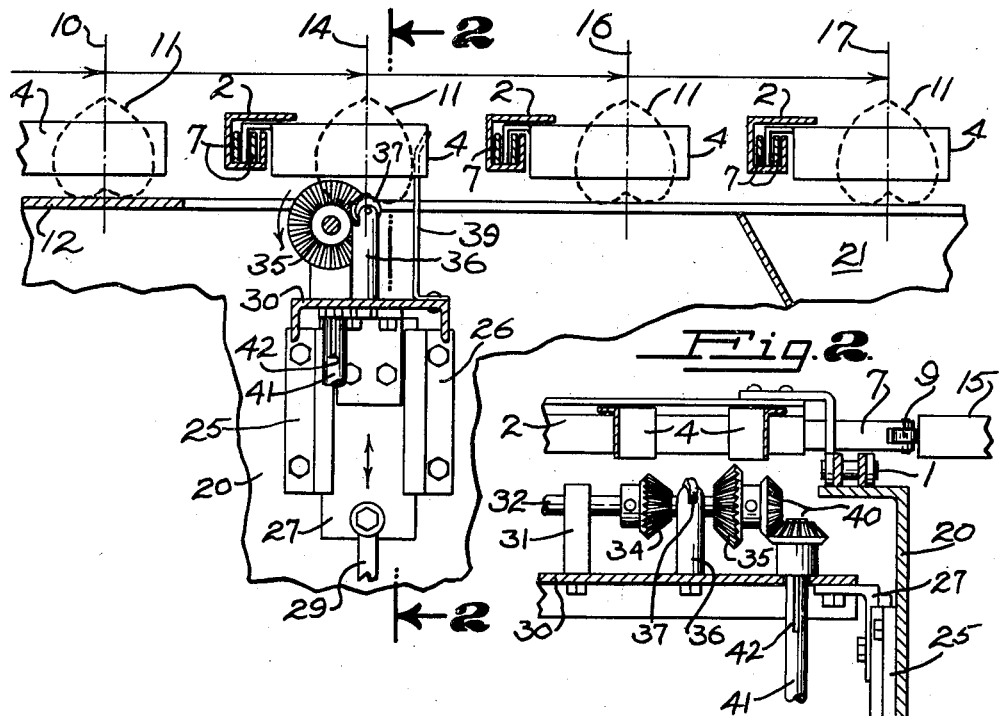
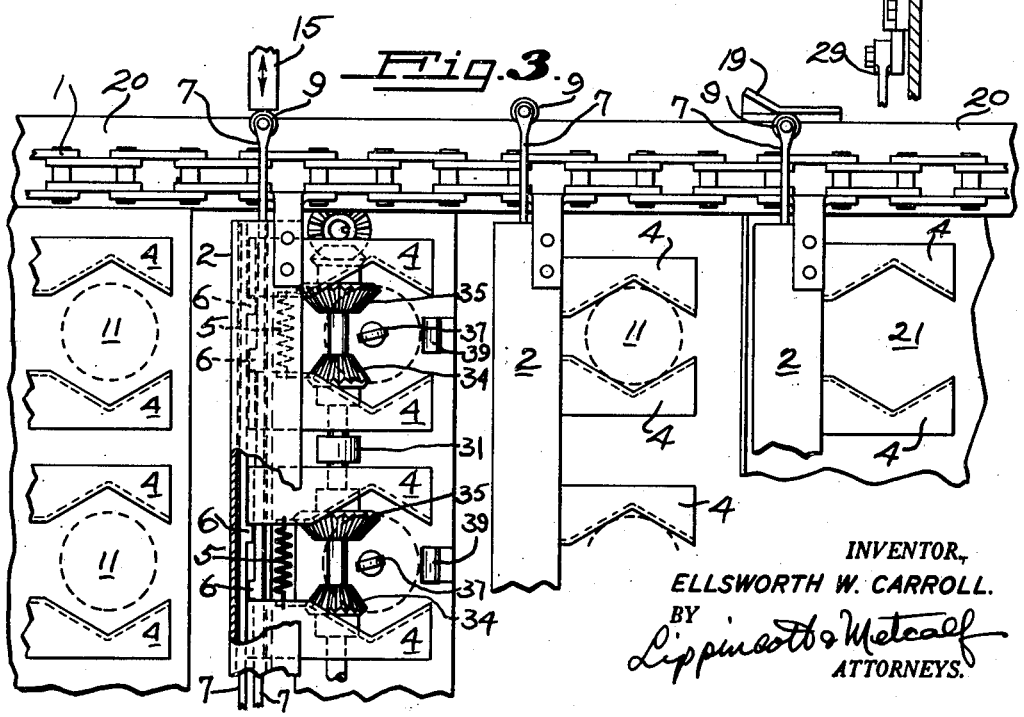
INVENTOR,
ELLSWORTH W. CARROLL.
BY
Lippincott & Metcalf
ATTORNEYS.

Patented Dec. 9, 1941

2,265,515

UNITED STATES PATENT OFFICE 2,265,515

FRUIT ORIENTATOR

Ellsworth W. Carroll, San Francisco, Calif., assignor to S & W Fine Foods, Inc., San Francisco, Calif., a corporation of California Application May 28, 1940, Serial No. 337,644

7 Claims. (Cl. 198—33)

My invention relates to fruit orientators and more particularly to an orientator which is able to rotate an indented fruit into a predetermined position and thereafter maintain that position in order that it may be pitted or otherwise operated upon along a predetermined desired axis. Broadly my invention comprises a pair of spaced fruit rotating members contacting the surface of the fruit and moving at differing speeds and in the same direction, so that when a cherry is contacted thereby the plane of rotation of the stem indent is continually changing. Thus the stem indent may, in only a few fruit revolutions pass a predetermined point. At that point I position a member capable of entering the stem indent of the fruit, this member thereafter opposing further fruit rotation of the driving members. I prefer to make gravity contact of the fruit with all three members.

In the drawing:

Figure 1 is a vertical view, partly in section and partly in elevation, of a single orientation stage as applied to a fruit conveyor, of which only a portion is shown.

Figure 2 is a view, partly in elevation and partly in section, taken at right angles to the view of Fig. 1 as indicated by the line 2—2 in Fig. 1.

Figure 3 is a top view of a portion of the conveyor chain, fruit, clamps, and the orientator.

My invention may be more fully understood by direct reference to the drawing. A conveyor element is formed from a plurality of hollow crossbars 2 joining two similar chains 1 traveling in parallel paths over a frame 3, preferably with an intermittent motion thus stopping the bars at predetermined stages along their paths of travel. Each bar is provided with a plurality of pairs of fruit clamps, these fruit clamps comprising opposed clamp arms 4 movably laterally on the bars with respect to each other to hold or release a fruit. The clamp arms enter the bar and are forced together by clamp arm springs 5, and are moved apart by dogs 6 on parallel operating rods 7 extending along the interior of bars 2, with one rod extending beyond one chain 1, the other extending beyond the opposite chain 1. Each rod operates all the clamp arms on one side of the clamps. Thus, motion of the operating rods 7 inwardly opens the clamp arms positively and when the operating rods are moved outwardly the clamp arms close due to the pull of the clamp springs 5. The end of each operating rod is provided with a cam roller 9.

In Fig. 1, I have shown four stages or stops of the conveyor bars. The first stage, indicated by broken line 10, is a loading stage where the clamp arms are held open and an indented fruit, such as a cherry 11, deposited therebetween in any aspect as regards the stem indent thereof, the cherry being maintained as to the vertical position by a lower base plate 12. The next stage is an orientation stage, as indicated by the broken line 14, and in this stage the clamp arms are opened and closed by the action of push rod 15, as shown in Fig. 3. The orientation mechanism will be described later. The third stage, as indicated by the broken line 16, is an operating stage where the cherry, for example, may be pitted and in this stage the clamp arms preferably hold the cherry while being operated upon. The fourth stage, as indicated by the broken line 17, is a discharge stage, and just prior to entering this stage the operating rods are moved to open the clamps by stationary cams 19 positioned on the edges of frame 3 and engaged by cam rollers 9 as the bars move by. Clamp arms are thus opened and the fruit which has been operated upon drops into discharge chute 21.

At orientation stage 14, I provide means for orientating the cherry so that the stem indent, or dimple, thereof is in a downward position. I do this, for example, in order that the cherries, when moved to operating stage 16, may be pitted by a pitting knife passing through the vertical axis of the fruit, this axis being an axis passing through the stem indent, the pit area, and the blossom end of the fruit. This type of pitting is highly desirable, as the fruit so pitted has a fine appearance, freedom from tears, and commands a premium in the market.

On each side of frame 3, I provide a pair of opposed guides 25 and 26, and mounted to reciprocate in each pair of guides is a slide 27, this slide being reciprocated with a vertical motion by crank 29, linked with the main driving mechanism and chain 1 to synchronize with the motion of the chain and the opening of the clamps in stage 14, as will be described later.

Mounted on both slides 27 and extending horizontally beneath the bars, is an orientator plate 30 carrying a plurality of upright bearing members 31. Upright bearing members 31 position a horizontal shaft 32 carrying a plurality of gear pairs, these gear pairs each comprising a small bevel gear 34 and a large bevel gear 35. These bevel gears are opposed with their small ends adjacent and are slightly spaced so that the gear teeth thereof can contact the bottom surface of a clamp-enclosed cherry on each side and slightly to the rear of the vertical axis thereof, using chain travel as a reference. Immediately below the axis of each clamp is positioned a stem indent rod 36, preferably terminating at its upper end in a stem indent roller 37. This stem indent roller together with the two gears form a three-point lower support against gravity for the cherry when the clamp arms are opened in position 14 to deposit a cherry on the orientation mechanism with the stem indent roller 37 substantially below the center of the fruit. The roller 37 is also preferably angularly placed to conform to the angular plane of rotation of the cherry due to the inequality in bevel gear size. The cherry is kept from falling off this three-point support by an upright 39 although the exact construction of this support 39 is not important as other means may well be utilized to keep the cherry on its three-point contact.

Shaft 32 is rotated by means of driving gears 40 driven by drive shaft 41 through a spline or sliding keyway 42 so that as the slide and orientating plate 30 are reciprocated vertically, shaft 41 may maintain its position.

Having thus described all the structural parts of the preferred embodiment of my device, I will now describe its operation. Chain 1 is moved intermittently through its path. As the clamps are opened in loading position 10 by a stationary cam similar to that used in position 17, cherries 11 from a hopper or similar device drop between the arms of the clamps. While the conveyor is stationary the clamps are closed and the cherries carried thereby are moved to position 14. As the cherries approach position 14, slides 27 carrying the orientating gears 34 and 35 and stem indent rollers 37 are moved upwardly to place the gears and rollers immediately below the still clamped but stationary cherries. Shaft 41 rotates gear 32 thereby rotating gears 34 and 35. I prefer that gears rotate anticlockwise as indicated by the arrow in Fig. 1. The clamp arms are then opened by action of push rods 15, and the cherries drop slightly to rest on their lower three-point supports, two points of each support being on gears 34 and 35 respectively, the third being on stem indent wheel 37, as shown in Fig. 1.

As soon, however, as the cherry surface contacts gears 34 and 35, all improperly orientated cherries are rotated. The rotational forces, however, are not applied at the same rate to the opposite sides of cherries by gears 34 and 35, because these gears are of different diameter. Thus, as each cherry rotates, the stem indent rotation plane will continuously change with respect to the vertical plane of the gear rotation. The stem indent area will therefore, within a very short time, be rotated to register with stem indent roller 37. This time will, of course, vary in accordance with how close the stem indent is to the stem indent roller when rotation starts, some cherries not being rolled at all, because they are positioned on the orientator from clamp arms 4 already properly orientated. Others may have the stem indent very close to roller 37 and become orientated almost instantly, still others may take a longer time. In any event, however, only a few revolutions are needed to bring the stem indent area into registry with the stem indent roller. When this registry occurs, the roller, which has been contacting the convex surface of the fruit, enters into the stem indent, and the cherry will change its vertical position and drop onto the roller 37. The side of the roller 37 away from the gears 34 and 35 will bear against the inside of the stem indent and oppose the further rotation of the fruit. In this respect it will be noticed that in order for the fruit to be again rotated, after the stem indent has dropped over the stem indent roller 37, the entire fruit would have to be lifted the distance that it dropped when registry occurred. The rotative forces applied by the gears are almost wholly horizontally and tangential and thus there is but little tendency for the gears to directly lift the fruit. However the weight of the fruit prevents the fruit being lifted out of registry with the stem indent roller once registry has occurred, and the opposition force causes the gears to slip on the surface of the fruit, and destroys the frictional moment of rotation. Thus, once a fruit has been orientated with stem indent down its stays in that position irrespective of the rotation of the gears 34 and 35. When the clamps close after a predetermined exposure of the fruit to rotation, these clamps will hold the fruit in the proper orientated position.

As soon as the clamps close the entire orientating assembly is lowered, thus freeing the clamp arms and bars from interference by the orientating structures so that the clamp arms with their properly orientated fruit may be moved into position 16, there to be operated upon by a pitter, for example, along the desired axis.

Thus, as the conveyor with its bars and clamp arms is progressed stage by stage, a new lot of fruit is loaded, orientated, operated upon in orientated position, and discharged.

I claim:

1. Means for orientating indented fruit comprising a fruit support having an upper surface shaped to enter the stem indent of a fruit, fruit retaining means for maintaining a fruit in position substantially directly over said support, and driving mean in fixed distance relation to said support for rotating said fruit in contact with said support until said support enters said indent.

2. Apparatus in accordance with claim 1 wherein said upper surface is the periphery of a wheel mounted to rotate freely.

3. Apparatus in accordance with claim 1 wherein said driving means includes a pair of spaced driving members positioned to form, with said upper surface, a three point support for said fruit against gravity.

4. Apparatus in accordance with claim 1 wherein said driving means includes a pair of spaced rotatable wheels positioned with the peripheries thereof spaced from said support to form a three point support for said fruit against gravity.

5. Apparatus in accordance with claim 1 wherein said driving means includes a pair of spaced rotatable wheels positioned with the peripheries thereof spaced from said support to form a three point support for said fruit against gravity, said wheels having facing bevels.

6. Apparatus in accordance with claim 1 wherein said driving means includes a pair of spaced rotatable wheels positioned with the peripheries thereof spaced from said support to form a three point support for said fruit against gravity, said wheels being mounted on a common shaft.

7. Apparatus in accordance with claim 1 wherein said driving means includes a pair of spaced rotatable wheels positioned with the peripheries thereof spaced from said support to form a three point support for said fruit against gravity, said wheels being mounted on a common shaft and having different diameters.

ELLSWORTH W. CARROLL.